United States Patent [19]
Barry

[11] 3,913,342
[45] Oct. 21, 1975

[54] MOTOR COMPRESSOR CONTROL

[75] Inventor: Vincent T. Barry, Camillus, N.Y.

[73] Assignee: Carrier Corporation, Syracuse, N.Y.

[22] Filed: July 1, 1974

[21] Appl. No.: 484,531

[52] U.S. Cl. .................. 62/115; 318/473; 62/230
[51] Int. Cl.² .................. F25B 1/00; G05B 5/00
[58] Field of Search ............ 62/158, 215, 226, 228, 62/230, 196, 113; 318/472, 473

[56] References Cited
UNITED STATES PATENTS

| | | | |
|---|---|---|---|
| 3,110,160 | 11/1963 | Miner | 62/228 |
| 3,695,054 | 10/1972 | Barry | 62/158 |

Primary Examiner—William E. Wayner
Attorney, Agent, or Firm—J. Raymond Curtin; Barry E. Deutsch

[57] ABSTRACT

A refrigeration unit comprising a motor compressor unit including a motor having a temperature responsive resistance element connected in series with the start winding thereof. The resistance element is disposed within a shell enclosing the motor compressor unit. Refrigerant gas contained within the shell passes in heat transfer relation with the resistance element to rapidly cool the element when the flow of current therethrough is interrupted due to the deenergization of the motor. The resistance element is thereby rapidly placed in a state to permit the flow of current therethrough to the start winding when the motor is reenergized.

9 Claims, 5 Drawing Figures

MOTOR COMPRESSOR CONTROL

BACKGROUND OF THE INVENTION

This invention relates to a motor compressor unit employed in a refrigeration unit, and in particular to a control therefor.

Utilization of single phase induction motors to drive the compressor of a refrigeration unit has become increasingly prevalent. Such refrigeration unit, including a compressor, a condenser, an evaporator, and expansion means is typically employed in an air conditioning system such as a room air conditioner.

Various types of single phase induction motors, such as split phase, permanent split capacitor, and capacitor start motors have been used to drive the compressor of a refrigeration unit. Each of these types of motors includes an auxiliary or start winding connected in parallel with a main winding and whose magnetic axes are spatially displaced. The use of the auxiliary or start winding is required since a motor having only a single winding would have zero starting torque.

Each of the above mentioned motors has some desirable features. However, each of the motors represents a compromise between optimum starting and optimum running characteristics.

Another type of single phase motor is the capacitor start, capacitor run motor. The start capacitor is optimized for starting conditions, whereas the run capacitor is optimized for running conditions. In open motor applications, a centrifugal switch is generally employed to disconnect the start capacitor after the motor has reached a predetermined speed. In hermetic systems, this is accomplished by means of a current or voltage actuated relay.

Although such motors perform efficiently due to optimization of the two capacitors, the motors have increased maintenance cost and lower reliability, possibly due to failure of the centrifugal switch or relay to operate satisfactorily. In addition, such motors are relatively expensive due to the several capacitors employed in the control circuit. These motors are therefore unsuitable for the highly competitive and cost conscious refrigerant compressor industry.

A variation of the capacitor start, capacitor run single phase motor is disclosed in copending application, Ser. No. 332,858, filed Feb. 15, 1973, now U.S. Pat. No. 3,852,648 as a continuation of U.S. application Ser. No. 146,710 filed May 25, 1971 and now abandoned, said applications having been filed in the names of Vincent T. Barry and George T. Privon. The control circuit disclosed in the cited copending United States application includes a temperature responsive resistance element connected in series with the start winding and in parallel with a capacitor. The capacitor is optimized for obtaining a desired running characteristic for the motor; whereas the temperature responsive resistance element is sized for obtaining the desired starting characteristics of the motor.

Upon startup of a compressor motor employing the foregoing control, the resistance of the temperature responsive element is low so the starting current is supplied through both the resistance element and the capacitor to the start winding. By employing both the resistance element and the capacitor for starting the motor, desired torque for starting purposes may be obtained. Once the motor has obtained predetermined speed, the resistance of the element has increased to a level such that substantially all flow of current therethrough is terminated. The current then flows to the start winding solely through the capacitor.

In the aforecited copending United States patent application, the restarting of the compressor motor for a predetemined period of time is prevented by the utilization of a switch responsive to the temperature of the temperature responsive resistance element. By maintaining the compressor motor deenergized for a predetermined period of time until the temperature responsive resistance element has decreased in temperature to repermit the flow of current therethrough, the pressure differential across the compressor is permitted to decrease to thereby decrease the magnitude of the torque required to restart the compressor motor.

In some motor compressor units, suitable valve means is employed to permit rapid equalization of the pressure differential across the compressor. Accordingly, in control circuits having a resistance element connected in parallel with a run capacitor and in series with the start winding, and including such pressure equalization valve means, it is desirable to rapidly cool the temperature reponsive resistance element when the motor has been deenergized. The element will be capable of again passing current to the start winding when the motor is reenergized.

SUMMARY OF THE INVENTION

It is an object of this invention to provide a refrigerant motor compressor having a temperature responsive resistance element connected in series with the start winding of the motor.

It is a further object of the present invention to place the temperature responsive resistance element within the shell of the motor compressor unit in heat transfer relation with the refrigerant gas contained therein.

It is yet another object of the present invention to rapidly cool the temperature responsive resistance element when the flow of current therethrough is interrupted due to the deenergization of the motor to thereby place the resistance element in a state to permit the flow of current therethrough to the start winding when the motor is reenergized.

These and other objects of the present invention are obtained in a refrigeration unit including a motor compressor unit enclosed within a shell, the motor including a temperature responsive resistance element connected in series with the start winding thereof. The temperature responsive resistance element is disposed within the shell enclosing the motor compressor unit. Refrigerant gas contained within the shell passes in heat transfer relation with the resistance element, the refrigerant gas removing heat therefrom when the flow of current therethrough has been interrupted due to the deenergization of the motor. The temperature responsive resistance element is rapidly cooled as a result of its rejecting heat to the refrigerant gas contained within the shell to thereby permit the flow of current therethrough to the start winding when the motor is reenergized.

DESCRIPTION OF THE PREFERRED EMBODIMENTS

Figure 1:
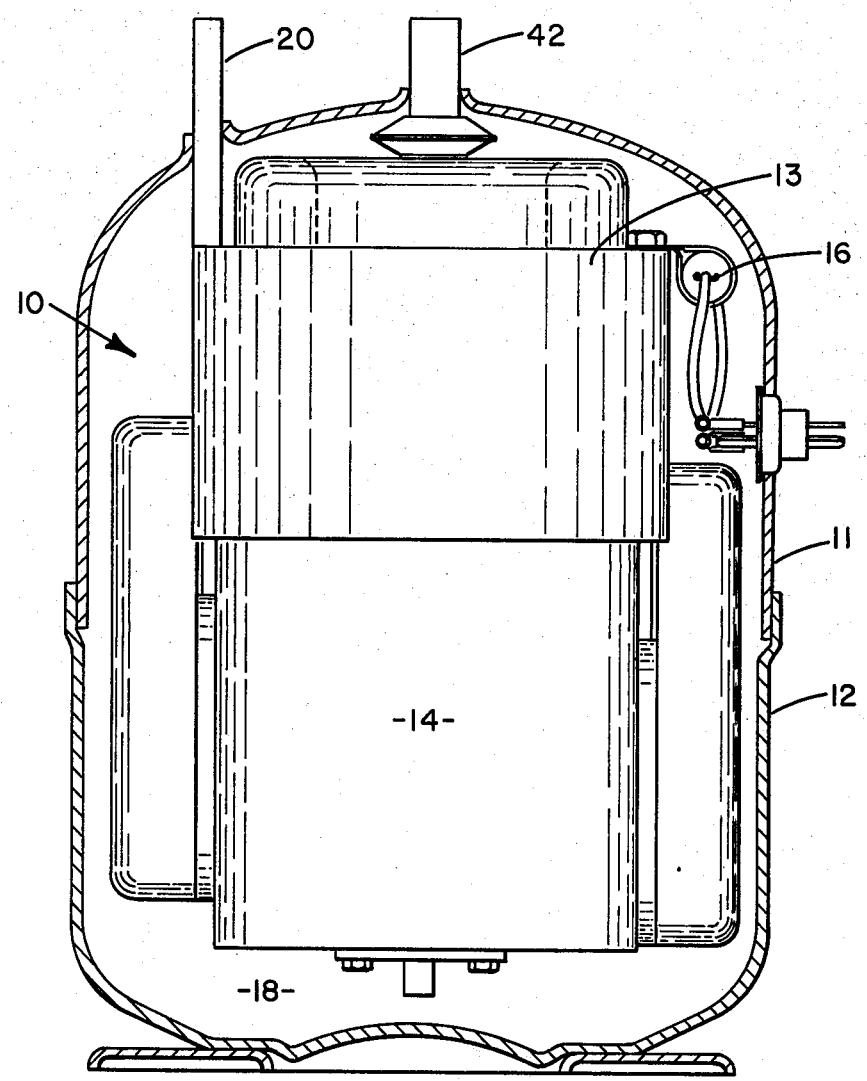
FIG. 1 is a side view, partially in section, of a motor compressor unit of a type employed in a refrigeration unit.

Referring to the drawings and in particular to FIG. 1, there is shown a preferred embodiment of a motor compressor unit employing a control arrangement in accordance with the present invention. In referring to the various Figures of the drawings, like numerals shall refer to like parts.

In FIG. 1, there is disclosed a motor compressor unit 10 of a type typically employed in a refrigeration unit. The motor compressor unit is hermetically sealed within upper shell 11 and lower shell 12, the shells being suitably connected together via means such as welding to provide a hermetic seal about motor compressor unit 10. Motor 13 is connected to the crankshaft (not shown) of reciprocating compressor 14. The details of compressor 14 are conventional and no explanation thereof is deemed necessary. It should be understood other types of compressors, for example rotary or screw types, may be employed in lieu of the reciprocating compressor illustrated.

A temperature repsonsive resistance element 16, shown as a positive temperature coefficient thermistor, is disposed within compartment 18 defined by hermetically sealed shells 11 and 12. Resistance element 16 is placed within the path of flow of refrigerant gas moving through compartment 18 for a reason to be more fully explained hereinafter.

Figure 2:
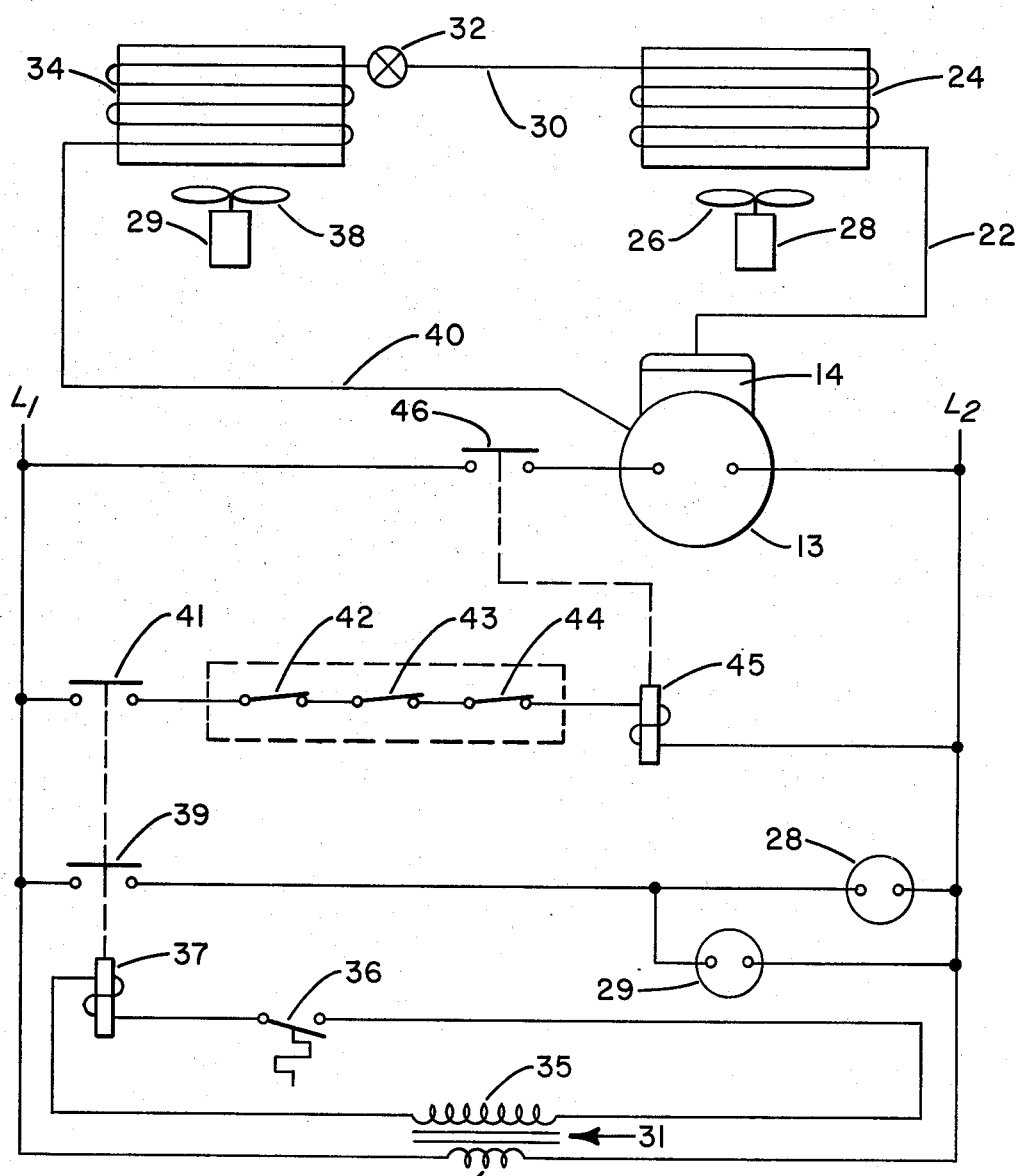
FIG. 2 is a schematic illustration of a refrigeration unit employed in an air conditioning system including a control circuit therefor.

Referring now to FIG. 2, there is schematically illustrated a refrigeration unit of a type in which motor compressor unit 10 is typically employed. Refrigerant gas which has been compressed as a result of the operation of compressor 14 is discharged from the motor compressor unit through line 20 (see FIG. 1). Line 20 communicates with conduit 22 through which the gas is supplied to condenser 24. A suitable cooling medium, for example ambient air, is routed over the surface of condenser 24 to pass in heat transfer relation with the vaporous refrigerant passing therethrough. The gas rejects heat to the cooling medium and is condensed thereby. Suitable means, for example fan 26, is provided to route the cooling medium over the surface of condenser 24.

The condensed refrigerant leaves condenser 24 via line 30 and thence passes through expansion device 32 to evaporator 34. Although, shown as a thermal expansion valve, expansion device 32 may be of any other typical expansion means (for example a capillary tube) employed in refrigeration units.

The refrigerant passes into evaporator 34 wherein the medium to be cooled, for example air, is passed in heat transfer relation with the gas flowing through the coils forming evaporator 34. Suitable means, for example fan 38, is provided to route the medium to be cooled in heat transfer relation with the refrigerant flowing through the evaporator. The refrigerant absorbs heat from the medium to be cooled and is vaporized thereby. The vaporous refrigerant leaves the evaporator and flows through line 40 which communicates with inlet 42 (see FIG. 1) of motor compressor unit 10. The refrigeration unit described above is representative of a type utilized in window mounted room air conditioners or similar air conditioning systems.

Again, referring to FIG. 2, a portion of the control circuit for the refrigeration unit hereinabove described is schematically shown. A suitable source of electric power represented by lines L1 and L2, is connected to primary winding 33 of transformer 31.

A secondary winding 35 of transformer 31 is connected in series with switch 36, responsive to the temperature of air circulating in an area being served by the refrigeration unit. When thermally actuated switch 36 is closed, current is supplied to control relay 37. Energization of relay 37 closes normally open switches 39 and 41. Once switch 39 has been closed, fan motors 28 and 29 are energized thereby actuating fans 26 and 38 respectively. The closure of switch 41 supplies current through normally closed switches 42, 43, and 44 to compressor contactor coil 45. Energization of the compressor contactor coil 45 closes normally open switch 46. Closure of normally open switch 46 connects compressor motor 13 across lines L1 and L2, thereby starting compressor 14. Normally closed switches 42, 43 and 44 are safety devices; respectively a high pressure cutout, a low pressure cutout, and a motor overload cutout. Other safety devices known to the art, such as a low pressure cutout, may also be used. The occurrence of the condition protected against will open the particular switch, thereby either preventing the compressor motor from starting or stopping the compressor motor during the normal operation of the refrigeration unit.

Figure 3:
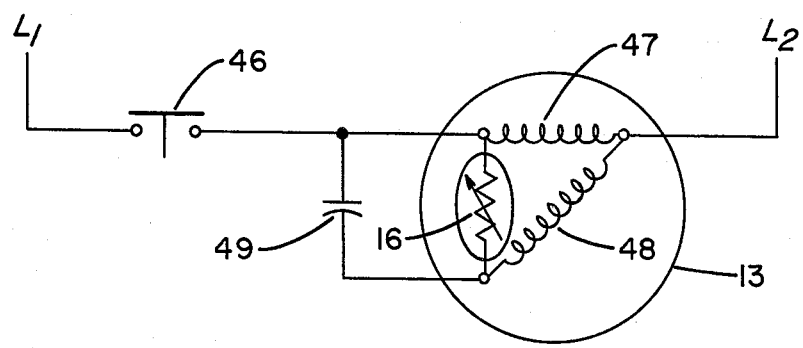
FIG. 3 is a detailed schematic wiring diagram of a portion of the control illustrated in FIG. 2, showing a first embodiment of the invention.

Referring now to FIG. 3, there is shown a detailed view of a first embodiment of the present invention. Motor 13 employed to drive compressor 14 is a single phase motor. The motor includes main or run winding 47 and auxiliary or start winding 48. The windings are connected in parallel with respect to each other. Capacitor 49 is connected in series with start winding 48. Capacitor 49 is optimized to obtain maximum normal operating characteristics for motor 13. Temperature responsive resistance element 16 is connected in parallel with capacitor 49 and in series with start winding 48. As heretofore noted, the temperature responsive resistance element is preferably a positive temperature coefficient thermistor. As is known to those skilled in the art, the element has a characteristic such that its resistance increases as a function of its temperature.

When switch 46 is closed due to the energization of compressor contactor coil 45, current flows to the start winding through thermistor 16. The resistance of the thermistor is initially at a relatively low level; accordingly, the current is supplied to the start winding through both the capacitor and thermistor. This provides a favorable phasing of the starting current to obtain desired starting torque. The resistance of thermistor 16 is predetermined so desired starting characteristics for motor 13 are obtained. When normal operating speed is obtained, the resistance of thermistor 16 has increased due to self-heating to a relatively high level, therefore, the current flow therethrough is substantially eliminated. The current flowing to the auxiliary winding then passes only through capacitor 49. By employing the thermistor and capacitor in the manner shown in FIG. 3, the motor is optimized to obtain desired starting and running characteristics.

When the motor is deenergized, the temperature of resistance element 16 is still at a relatively high level whereby the resistance thereof is also at a relatively high level to prevent any flow of current therethrough. Accordingly, the starting torque available to restart the motor is not at its optimum value. In addition, the pressure differential across the compressor when the motor is deenergized is quite substantial. It is thus desirable to prevent the motor compressor unit from being restarted for a predetermined time interval to thereby permit the pressure differential across the motor compressor unit to substantially equalize. In the alternative, valve means or other suitable means may be provided to permit rapid equalization of the pressure differential to thereby permit rapid restarting of the motor compressor unit.

In accordance with the present invention, the temperature responsive resistance element is installed within compartment 18 defined by hermetically sealed shells 11 and 12. During normal operation of the motor compressor unit, the refrigerant gas passing over the surface of element 16 has only a minimal effect on the temperature thereof. The resistance of element 16 substantially increases due to the temperature increase caused by the flow of current thereto. The high level of resistance of element 16 prevents passage of any appreciable current therethrough to winding 48. However, when the motor compressor unit is deenergized, and the flow of current thereto is completely interrupted, the refrigerant gas passing in heat transfer relation with the surface of the resistance element rapidly cools the same to thereby reduce the resistance thereof. The flow of gas across the element during compressor deenergization is obtained due to the pressure differential existing between the discharge side and the suction side of the motor compressor unit.

The movement of refrigerant gas in heat transfer relation with the surface of the temperature responsive resistance element rapidly cools the same to place the responsive element in a state to permit the flow of current therethrough to the start winding when the motor is reenergized. Accordingly, rapid restarting of the motor may be obtained with the desired optimized starting characteristics.

The present control arrangement permits rapid restarting of compressor motors without effecting the desired starting characteristics therefor.

Figure 4:
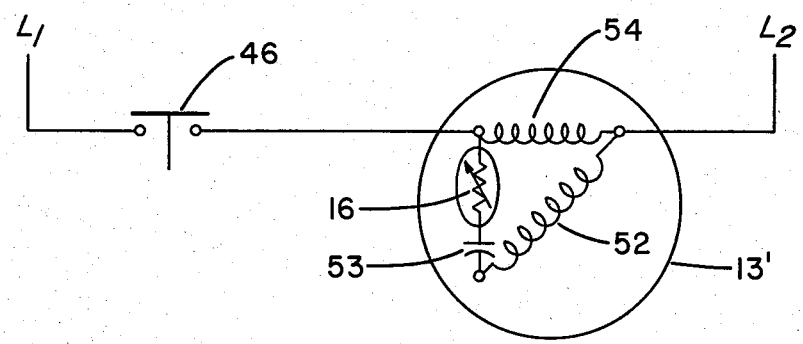
FIG. 4 is a view similar to the view illustrated in FIG. 3, illustrating a second embodiment of the invention.

Referring now to FIG. 4, there is illustrated an alternate embodiment of the invention. Instead of a resistance start-capacitor run motor as illustrated in FIGS. 2 and 3, the motor compressor unit is a capacitor start motor 13'. Although, the running characteristics are not optimized as is accomplished with the resistance start-capacitor run motor, the capacitor start motor is generally less expensive to install and finds widespread utilization, particularly in refrigeration units of relatively small size. Temperature responsive element 16 is installed in series with start winding 52 and also in series with capacitor 53. Element 16 is still disposed within compartment 18 of motor compressor unit 10. Upon initial energization of motor 13', the resistance of element 16 is minimal; therefore, the flow of current to the motor goes through capacitor 53 to start winding 52. Additionally, current flows to main winding 54.

As the motor attains normal operating speed, the resistance of element 16 increases due to its increased temperature. Consequently, element 16 interrupts the flow of current through capacitor 53 to winding 52. Upon deenergization of motor 13', refrigerant gas contained within compartment 18 will extract heat from element 16, to rapidly place the element in its low resistance state whereby current may again pass to winding 52 when reenergization of motor 13' is desired.

Figure 5:
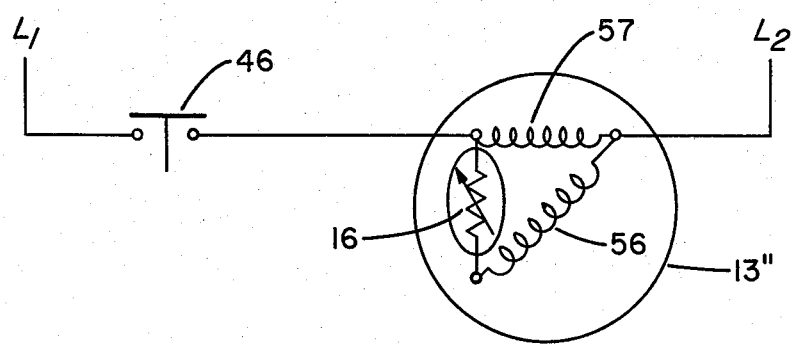
FIG. 5 is a view similar to FIGS. 3 and 4 showing a third embodiment of the invention.

Referring to FIG. 5, a third embodiment of the invention is disclosed. FIG. 5 illustrates a split-phase motor, that is a motor having a start winding and a run winding displaced in phase with respect to each other by 90°. The utilization of such motors has also found wide acceptance within the refrigeration industry. Element 16 is connected in series with start winding 56 of motor 13''. Upon initial energization, the resistance of element 16 is minimal, therefor current flows to both start winding 56 and run winding 57. The utilization of start winding 56 provides the necessary torque for starting motor 13''.

When the motor attains normal operating speed, the current passing through element 16 has raised the temperature thereof to thereby increase the element's resistance. Consequently, flow of current to winding 56 is interrupted.

Upon deenergization of motor 13'', the refrigerant gas within compartment 18 of unit 10 passing in heat transfer relation with element 16 will extract heat therefrom to rapidly decrease its temperature. As the temperature of element 16 decreases, its resistance also decreases. Consequently, element 16 is rapidly returned to its low resistance state whereby current may again pass to winding 56 when motor 13'' is reenergized.

While preferred embodiments of the present invention have been described and illustrated, the invention should not be limited thereto, but may be otherwise embodied within the scope of the following claims.

I claim:

1. In a refrigeration unit including a motor compressor unit enclosed within a shell, said motor including a start winding, the improvement comprising:

a temperature responsive resistance element connected in series with the start winding of the motor, the resistance of said responsive element substantially increasing as a function of its temperature, the temperature thereof being increased by the flow of current therethrough, said responsive element being disposed within the shell enclosing said motor compressor unit, refrigerant gas contained within said shell passing in heat transfer relation with said responsive element, the refrigerant gas removing heat from said responsive element when the flow of current thereto is interrupted due to the deenergization of the motor whereby the responsive element is rapidly cooled to place the element in a state to permit the flow of current therethrough to said start winding when the motor is reenergized.

2. In an air conditioning system operable to supply conditioned air to an area including a refrigeration unit comprising a compressor, a condensor, an evaporator and expansion means connected in a closed circuit, a motor for actuating said compressor, said motor having a main winding and start winding connected in parallel, said motor and compressor being enclosed within a shell, the improvement comprising:
- a supply circuit for providing electrical energy to said compressor motor including thermally responsive switch means operable to energize said supply circuit in response to temperature conditions in said area;
- a temperature responsive resistance element connected in series with said start winding of said compressor motor, the resistance of said responsive element substantially increasing as a function of its temperature, the temperature thereof being increased by the flow of current therethrough, said responsive element being disposed within the shell enclosing said motor compressor unit whereby refrigerant gas contained within said shell passes in heat transfer relation with said responsive element; and
- capacitor means connected in series with said start winding and in parallel with said temperature responsive element, current to the start winding during starting conditions flowing through both said capacitor means and said temperature responsive element in a predetermined relationship, current through said start winding passing through said capacitor means when the resistance of said element substantially eliminates the flow of current therethrough when normal operating conditions have been obtained, whereby the refrigerant gas removes heat from said temperature responsive element when the flow of current thereto is interrupted due to the deenergization of said compressor motor to thereby rapidly cool the resistance element to place the element in a state to permit the flow of current therethrough to said start winding when the motor is reenergized.

3. A combination in accordance with claim 1 wherein said temperature responsive resistance element is a positve temperature coefficient thermistor.

4. A combination in accordance with claim 1 wherein said motor includes capacitor means connected in series with said temperature responsive resistance element and with said start winding.

5. A combination in accordance with claim 1 wherein said motor includes capacitor means connected in parallel to said temperature responsive resistance element and in series with said start winding.

6. A combination in accordance with claim 2 wherein said temperature reponsive resistance element is a positive temperature coefficient thermistor.

7. In an air conditioning system operable to supply conditioned air to an area including a refrigeration unit comprising a compressor, a condenser, an evaporator and expansion means connected in a closed circuit, a motor for actuating said compressor, said motor having a main winding and a start winding connected in parallel, said motor and said compressor being enclosed within a shell, the improvement comprising:
- a supply circuit for providing electrical energy to said compressor motor including thermally responsive switch means operable to energize said supply circuit in response to temperature conditions in said area; and
- a temperature responsive resistance element connected in series with said start winding of the motor, the resistance of said reponsive element substantially increasing as a function of its temperature, the temperature thereof being increased by the flow of current therethrough, said responsive element being disposed within the shell enclosing said motor compressor unit, refrigerant gas contained within said shell passing in heat transfer relation with said responsive element, the refrigerant gas removing heat from said responsive element when the flow of current thereto is interrupted due to the deenergization of the motor whereby the responsive element is rapidly cooled to place the element in a state to permit the flow of current therethrough to said start winding when the motor is reenergized.

8. In the combination in accordance with claim 7, said motor further including capacitor means connected in series with said start winding and with said temperature responsive resistance element.

9. A method of controlling the operation of a motor compressor unit enclosed within a shell, the motor of said unit including a start winding and a run winding connected in parallel, comprising the steps of:
- providing a temperature responsive resistance element in series with the start winding of the motor, the resistance of said element increasing as a function of its own temperature, the temperature thereof being increased by the flow of current therethrough;
- energizing the motor of said unit, the flow of current to the motor increasing the temperature, and thus the resistance of said element to substantially eliminate the flow of current to said start winding;
- deenergizing the motor to discontinue operation of said motor compressor unit; and
- passing refrigerant gas in heat transfer relation with the surface of the resistance element immediately upon deenergization of said motor, the refrigerant removing heat from said element to rapidly cool the element to place the element in a state to permit the flow of current therethrough to said start winding when the motor is reenergized.

* * * * *